United States Patent Office 3,324,181
Patented June 6, 1967

3,324,181
PREPARATION OF DIFLUOROAMINO COMPOUND BY AQUEOUS FLUORINATION
Margaret H. Dineen, Nederland, Tex., assignor to The Dow Chemical Company, Midland, Mich., a corporation of Delaware
No Drawing. Filed Feb. 14, 1964, Ser. No. 347,641
(Filed under Rule 47(b) and 35 U.S.C. 118)
5 Claims. (Cl. 260—583)

This invention relates to the preparation of fluoro-substituted organic compounds and more particularly is concerned with a novel process for preparing bis(difluoroamino)methane.

Heretofore the known art has taught that bis(difluoroamino)methane $[CH_2(NF_2)_2]$ is prepared by reacting formaldehyde with difluoroamine ($HNF_2$). This process requires the preparation and isolation of the difluoroamine reactant.

Now, unexpectedly it has been found in the present process that bis(difluoroamino)methane can be prepared directly from readily available reactants. Therefore it is a principal object of the present invention to provide a novel process for preparing bis-difluoroamino)methane from readily available materials. It is also an object of the present invention to provide a novel process for preparing bis(difluoroamino)methane which does not require the preparation of difficulty preparable and hard to handle precursor materials.

Other objects and advantages readily will become apparent from the detailed description presented hereinafter.

The present invention in general comprises reacting formaldehyde or a formaldehyde producing organic compound with fluorine in the presence of an ammonium salt in an aqueous medium.

More particularly the present invention comprises passing fluorine through an aqueous mixture of formaldehyde and ammonium sulfate or ammonium fluoride over a period of from about 15 minutes to about 2.5 hours or more while maintaining the reaction temperature at from about minus 10° C. to about 100° C. thereby to produce bis(difluoroamino)methane directly. This product readily is recovered by collecting the exit gas stream from the reactor and fractionating. Conveniently, the gas stream exiting from the reactor can be passed through cold traps to condense the bis-(difluoroamino) methane product.

The reaction proceeds readily at atmospheric pressure. However, if desired superatmospheric pressures can be used.

The relative amounts of reactants is not critical. Usually the ratio of formaldehyde/ammonium salt ranges from about 0.5 to about 1.5. Preferably about equal weights of the ammonium salt and formaldehyde usually are employed or an excess of the ammonium salt is used. For ease in handling, ordinarily the total amount of formaldehyde and ammonium salt solute in the aqueous reaction mixture is from about 1 to about 10 weight percent, about 2 weight percent being preferred. These weights, however, are not limiting or critical. The amount of fluorine employed at a minimum is such to provide for stoichiometric preparation of the bis(difluoroamino) methane product. Conveniently, the fluorine is added in an amount and for a period of time until the exit gases indicate free fluorine in admixture with the product material.

For ease in handling, ordinarily the fluorine is diluted with an inert gas, e.g. argon or nitrogen, before introduction into the aqueous reaction mixture. Conveniently, the gaseous fluorine reactant is introduced by bubbling it into the aqueous mixture of formaldehyde and ammonium salt under the surface of the aqueous mass. This action provides a desirable agitation in the reaction mixture. With use of an inert gas/fluorine mixture, larger quantities of gas can be used thereby serving to promote the agitation. If desired, additional mechanical, magnetic, electrical or other mixing techniques can be used to promote agitation of the mix to aid in promoting the product preparation.

Although ammonium sulfate or ammonium fluoride ordinarily are used as the ammonium salt other inorganic ammonium salts can be employed.

Formaldehyde, because of its ready availability and low cost ordinarily is employed. However, other formaldehyde producers such as hexamethylenetetramine, trioxane and the like can be substituted for formaldehyde in the present process.

The following example will serve to further illustrate the present invention but is not meant to limit it thereto.

Example.—About 300 cubic centimeters of water, about 3.7 grams of ammonium fluoride and about 10 cubic centimeters of aqueous formaldehyde solution (37 weight percent HCHO and equivalent to about 3 grams formaldehyde) were introduced into a one liter glass three-necked flask equipped with a mechanical stirrer, gas inlet tube and gas outlet tube. The outlet tube was attached to two glass U-traps positioned in series and maintained at a temperature of about minus 140° C. by immersion in a mixture of solid and liquid dichlorodifluoromethane, i.e. a "$CF_2Cl_2$ slush." The reaction flask itself was immersed in an ice bath at a temperature of about 0 to about 2° C.

Fluorine gas diluted with nitrogen was bubbled through the stirred reaction mixture at the rate of about 190 cubic centimeters per minute (50 cubic centimeters $F_2$ plus 140 cubic centimeters $N_2$ per minute) for about one hour.

After this period, the gases exiting from the second trap were sampled and found to give a positive test for fluorine with KI test paper. The fluorine gas flow was discontinued; the traps were sealed and removed from the "$CF_2Cl_2$ slush" and stored at a temperature of about minus 80° C.

The products from the trap adjacent the reactor vessel were separated by vapor phase chromatography. The fractions were collected and analyzed by infrared spectroscopy. The major constituent found in the product mass was identified as bis(difluoroamino)methane. Relatively minor amounts of $CH_2FNF_2$, $CH_2F_2$, $CHF_3$, and $NF_3$, also were found in the product mass.

The amount of bis(difluoroamino)methane recovered indicated a good product yield.

This procedure was repeated several times employing ammonium sulfate instead of ammonium fluoride as the ammonium salt. In each run, bis(difluoroamino)methane was produced in good yield as the principal reaction product.

Various modifications can be employed in the present process without departing from the spirit or scope thereof for it is understood that I limit myself only as defined in the appended claims.

I claim:
1. A process for preparing bis(difluoroamino)methane which comprises;
    (a) adding fluorine to an aqueous dispersion of a member selected from the group consisting of formaldehyde and formaldehyde producing organic compounds and an ammonium salt,
    (b) collecting the gaseous product stream, and
    (c) recovering bis(difluoroamino)methane therefrom.
2. A process for preparing bis(difluoroamino)methane which comprises:
    (a) adding fluorine over a period of from about 15 minutes to about 2.5 hours to an aqueous solution of formaldehyde and an ammonium salt selected from the group consisting of ammonium fluoride and ammonium sulfate, said solution being at a temperature of from about minus 10° C. to about 100° C., the total amount of said formaldehyde and said ammonium salt in said aqueous solution being present in amount of from about 1 to about 10 weight percent based on the total solution weight, and the ratio of said formaldehyde/ammonium salt in said solution ranging from about 0.5 to about 1.5, the amount of fluorine introduced into said solution being at a minimum that required stoichiometrically for formation of said bis(difluoroamino)methane product, (b) collecting the product gas stream in a cold trap thereby to condense said bis(difluoroamino)methane, and (c) recovering said bis(difluoroamino)methane from the product mass.

3. The process as defined in claim 2 and including the step of bubbling fluorine into the aqueous formaldehyde-ammonium salt solution while said solution is being agitated.

4. The process as defined in claim 2 wherein the fluorine gas is introduced into the aqueous solution as an admixture with an inert gas.

5. A process for preparing bis(difluoroamino)methane which comprises;

(a) bubbling for about 1 hour at about 0° C. and a flow rate of about 190 cubic centimeters per minute a mixture of about 3 parts by volume nitrogen and about 1 part by volume fluorine into an aqueous solution of formaldehyde and ammonium fluoride, the weight ratio of said formaldehyde to said ammonium fluoride in said solution being about 0.8 and the total amount of said formaldehyde and said ammonium fluoride in said aqueous solution being about 2 weight percent based on the solution weight.

(b) condensing the gaseous product mass in a cold trap, and (c) recovering bis(difluoroamino)methane from the condensed product mass.

No references cited.

CHARLES B. PARKER, *Primary Examiner.*

R. L. RAYMOND, *Assistant Examiner.*